United States Patent [19]

Abe et al.

[11] Patent Number: 5,086,105
[45] Date of Patent: Feb. 4, 1992

[54] THERMOPLASTIC RESIN COMPOSITION

[75] Inventors: Hiroomi Abe; Taichi Nishio; Kaoru Kitadono, all of Chiba, Japan

[73] Assignee: Sumitomo Chemical Co. Ltd., Osaka, Japan

[21] Appl. No.: 448,338

[22] Filed: Dec. 11, 1989

[30] Foreign Application Priority Data

Dec. 15, 1988 [JP] Japan .................. 63-317020

[51] Int. Cl.$^5$ .................. C08L 83/07; C08K 3/36
[52] U.S. Cl. .................. 524/492; 524/262;
524/493; 524/494; 524/847; 524/275; 524/278;
524/279; 525/66; 525/68; 525/132; 525/393;
525/396; 525/397
[58] Field of Search ............ 524/262, 847, 492, 493, 524/494

[56] References Cited

U.S. PATENT DOCUMENTS

| 4,315,086 | 2/1982 | Ueno et al. .................. 525/391 |
| 4,339,376 | 7/1982 | Kasahara et al. .................. 524/116 |
| 4,433,088 | 2/1984 | Haaf et al. .................. 524/153 |
| 4,596,670 | 6/1986 | Liu .................. 524/439 |
| 4,614,773 | 9/1986 | Sugio et al. .................. 524/494 |
| 4,624,979 | 11/1986 | Axelrod et al. .................. 524/847 |
| 4,831,074 | 5/1989 | Moriwaki et al. .................. 524/494 |
| 4,873,276 | 10/1989 | Fujii et al. .................. 524/153 |
| 4,874,810 | 10/1989 | Lee, Jr. et al. .................. 524/494 |
| 4,879,847 | 10/1989 | Masu et al. .................. 525/397 |
| 4,892,904 | 1/1990 | Ting .................. 524/494 |
| 4,894,415 | 1/1990 | Sasaki et al. .................. 524/492 |
| 4,968,749 | 11/1990 | Shibuya et al. .................. 525/92 |
| 4,997,612 | 3/1991 | Gianchandai et al. .................. 524/494 |
| 5,019,616 | 5/1991 | Avakian et al. .................. 524/494 |

FOREIGN PATENT DOCUMENTS

| 260123 | 3/1988 | European Pat. Off. . |
| 270795 | 6/1988 | European Pat. Off. . |
| 8705304 | 9/1987 | Int'l Pat. Institute . |
| 61-204263 | 9/1986 | Japan . |
| 63-101452 | 5/1988 | Japan . |

Primary Examiner—Paul R. Michl
Assistant Examiner—Christopher D. Rogers
Attorney, Agent, or Firm—Cushman, Darby & Cushman

[57] ABSTRACT

The present invention provides a filler-containing thermoplastic resin composition which is well balanced in dimensinoal stability, rigidity, heat resistance and impact strength. This composition comprises: (I) 100 parts by weight of a resin comprising 5-95% by weight of a polyphenylene ether resin, a mixture of a polyphenylene ether resin and a styrene resin or a graft polymer of a polyphenylene ether resin and styrene and 95-5% by weight of polyamide resin, (II) 0-50 parts by weight of a rubber-like material, (III) 2.0-50 parts by weight of an inorganic filler having an average particle size of 5.0$\mu$ or less and/or a glass fiber and (IV) 0.01-10 parts by weight of at least one compatibilizing agent which improves compatibility between the polyphenylene resin and the polyamide resin. Talc is preferred as the inorganic filler.

27 Claims, No Drawings

THERMOPLASTIC RESIN COMPOSITION

The present invention relates to a novel thermoplastic resin composition which can be made into shaped articles, sheets, etc. by injection molding, extrusion molding, etc.

More particularly, it relates to a novel thermoplastic resin composition which comprises a polyphenylene ether, a polyamide and an inorganic filler and/or a glass fiber, which is superior in heat resistance, mechanical properties, processability, solvent resistance and dimensional stability thanks to small linear expansion coefficient and small warpage.

Polyphenylene ether resin is a thermoplastic resin superior in various properties such as mechanical properties, heat resistance, low-temperature resistance and dimensional stability. However, polyphenylene ether resin itself is considerably inferior in impact strength and solvent resistance and besides is inferior in processability owing to its high melt viscosity. On the other hand, polyamide resin is a thermoplastic resin characterized by superior mechanical properties, solvent resistance and processability, but is inferior in impact strength and heat resistance and besides extremely inferior in dimensional stability owing to its high water absorption. In order to make the best use of the characteristics of these resins and offset the defects, it has been proposed to blend these resins. However, blends of these resins are insufficient in dimensional stability, rigidity and heat stability in some fields of uses as shaped articles and an attempt has been made to add a filler in order to improve dimensional stability, heat resistance and rigidity of polyphenylene ether-polyamide compositions.

Japanese Patent Kokai No. 63-101452 discloses a composition to which are added wollastonite mainly composed of calcium silicate and/or glass fiber, but this composition is great in reduction of falling weight impact strength though high in improvement in flexural modulus.

Japanese Patent Kokai No. 61-204263 discloses a composition which comprises an aromatic polyphenylene ether resin, a styrene compound-α,β-unsaturated carboxylic anhydride and a polyamide of high melting point in which is incorporated a fibrous, flaky or powdery reinforcing agent. This refers to soldering heat resistance (deformation, warpage, etc.), but this composition is low in Izod impact strength and limited in utility.

Japanese Patent Kokai Nos. 61-130368 and 62-240354 disclose a composition comprising a combination of a specific flame retardant and a filler and a composition comprising a polyphenylene oxide resin and a specific polyamide resin to which are added a filler and a flame retardant. However, these compositions are insufficient in impact strength.

No polyphenylene ether-polyamide resins containing filler have been obtained which are well balanced in dimensional stability (low linear expansion coefficient), rigidity, heat resistance and impact strength.

The present invention provides a filler-containing polyphenylene ether-polyamide composition which comprises a polyphenylene ether-polyamide composition in which are incorporated an inorganic filler and/or a glass fiber and which is high in dimensional stability, especially small in linear expansion coefficient at high temperatures and excellent in flexural rigidity, heat resistance and impact strength. This composition will be referred to merely as "filler-containing composition" hereinafter.

That is, as a result of the inventors' extensive research conducted to develop techniques effective in improvement of filler-containing compositions comprising polyphenylene ether, polyamide, rubber-like material, compatibilizing agent and filler, it has been found that dimensional stability, heat resistance and flexural rigidity of polyphenylene ether-polyamide composition can be improved with retaining impact strength, processability and appearance by adding thereto a specific inorganic filler and/or glass fiber in a specific amount.

Furthermore, when inorganic filler is incorporated into compositions such as polyphenylene ether-polyamide composition which are molded at high temperatures (280°-320° C.), there occur phenomena which bring about poor appearance such as bubbling in the molded product near gate due to water contained in the inorganic filler, but this problem has also been solved by using a specific inorganic filler according to the present invention.

That is, the present invention relates to a thermoplastic resin composition which comprises (I) 100 parts by weight of a resin comprising 5–95 wt. % of a polyphenylene ether resin, a mixture of a polyphenylene ether and a styrene resin or a graft copolymer of a polyphenylene ether resin and styrene and 95–5 wt. % of a polyamide resin, (II) 0–50 parts by weight of a rubber-like material, (III) 2.0–50 parts by weight of an inorganic filler having an average particle size of 5.0 μ or less and/or glass fiber and (IV) 0.01–10 parts by weight of at least one compatibilizing agent which improves compatibility of the polyphenylene ether resin and the polyamide resin.

As the compatibilizing agent (IV), the following compounds (A)–(G) are preferred:

(A) Compounds having in their molecule both (a) carbon-carbon double bond or carbon-carbon triple bond and (b) carboxyl group, acid anhydride group, amino group, acid amide group, imido group, epoxy group, carboxylate group, isocyanate group, methylol group or hydroxyl group;

(B) Aliphatic polycarboxylic acids represented by the formula: $(R^IO)_m(COOR^{II})_n(CONR^{III}R^{IV})_s$ [wherein R is a straight chain or branched chain saturated aliphatic hydrocarbon group of 2–20 carbon atoms; $R^I$ is a hydrogen atom, or an alkyl, aryl, acyl or carbonyldioxy group which has 1–10 carbon atoms; each $R^{II}$ is independently a hydrogen atom or an alkyl or aryl group which has 1–20 carbon atoms; $R^{III}$ and are independently a hydrogen atom or an alkyl or aryl group which has 1–10 carbon atoms; $m=1$, $(n+s) \geq 2$, $n = \geq 0$ and $s \geq 0$; and $(OR^I)$ is on α or β position relative to carbonyl group and at least two carbonyl groups are separated by 2–6 carbon atoms] or derivatives thereof or reaction products thereof;

(C) Functionalized polyphenylene ethers comprising reaction products of (a) polyphenylene ether and (b) a compound of the formula: (i)—Z—(ii) [wherein (i) is a group of the formula: [X—C(O)—(wherein X is F, Cl, Br, I, OH, —OR or —O—C(O)—R where R is H, an alkyl group or an aryl group), (ii) is a carboxylic acid group, an acid anhydride group, an acid amide group, an imido group, a carboxylate group, an amino group or a hydroxyl group, (i) and (ii) are covalently bonded through a bridge Z, and Z is a divalent hydrocarbon group];

(D) Organo silane compounds having in molecular both (a) at least one silicon bonded to carbon through an oxygen link and (b) at least one ethylenic carbon-carbon double bond or carbon-carbon triple bond and/or functional group selected from the group consisting of an amino group and a mercapto group, in which the functional group is not bonded directly to the silicon atom;

(E) Oxidized polyolefin waxes;

(F) Copolymers having unit of vinyl-aromatic compound and unit of $\alpha,\beta$-unsaturated dicarboxylic acid or dicarboxylic anhydride or copolymers having unit of vinyl aromatic compound and unit of $\alpha,\beta$-unsaturated dicarboxylic imido compound; and (G) At least one compound selected from the group consisting of a reaction product of (a) a 1,2-substituted olefin compound having a carboxyl group or an acid anhydride group, (b) polyphenylene ether and (c) a free-radical initiator and a reaction product of (a) and (b) in the absence of (c).

Furthermore, it has been found that dimensional stability, especially linear expansion coefficient at high temperatures, heat resistance and flexural rigidity of polyphenylene etherpolyamide compositions can be improved with retaining its impact strength, processability and appearance by using an inorganic filler having an average particle size of 5.0 $\mu$ or less or having an average particles size of 5.0 $\mu$ or less and an aspect ratio (longer diameter/thickness) of 5 or more, preferably talc having an average particle size of 5.0 $\mu$ or less and showing loss in weight of 0.2% by weight or less on heating for 2 hours at 300° C.

The polyphenylene ether resin (I) used in the present invention is a polymer obtained by oxidative polymerization with oxygen or oxygen-containing gas of at least one phenol compound represented by the formula:

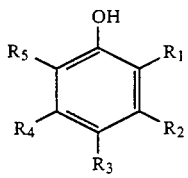

(wherein $R_1$, $R_2$, $R_3$, $R_4$ and $R_5$ each represents a hydrogen atom, a halogen atom, a hydrocarbon residue or a substituted hydrocarbon residue and at least one of them is a hydrogen atom) using an oxidative coupling catalyst.

Examples of $R_1$, $R_2$, $R_3$, $R_4$ and $R_5$ in the above formula are hydrogen atom, chlorine atom, bromine atom, fluorine atom, iodine atom, methyl group, ethyl group, n- or iso-propyl group, pri-, sec- or t-butyl group, chloroethyl group, hydroxyethyl group, phenylethyl group, benzyl group, hydroxymethyl group, carboxyethyl group, methoxycarbonylethyl group, cyanoethyl group, phenyl group, chlorophenyl group, methylphenyl group, dimethylphenyl group, ethylphenyl group and allyl group.

Examples of the phenol compounds as shown by the above formula are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t-butylphenol, thymol, and 2-methyl-6-allylphenol. Furthermore, there may also be used copolymers of the phenol compounds of the above formula and other phenol compounds, for example, polyhydroxy aromatic compounds such as bisphenol A, tetrabromobisphenol A, resorcin, hydroquinone and novolak resin.

Of these compounds, preferred are homopolymer of 2,6-dimethylphenol or 2,6-diphenylphenol and copolymers of a major amount of 2,6-xylenol and a minor amount of 3-methyl-6-t-butylphenol or 2,3,6-trimethylphenol.

Any oxidative coupling catalysts can be used for oxidative polymerization of the phenol compounds as far as they have polymerization ability. Typical examples thereof are cuprous salt-tert. amine such as cuprous chloride-triethylamine and cuprous chloride-pyridine; cupric salt-tert. amine-alkali metal hydroxide such as cupric chloride-pyridine-potassium hydroxide; manganese salt-primary amine such as manganese chloride-ethanolamine and manganese acetate-ethylenediamine; manganese salt-alcoholate or phenolate such as manganese chloride-sodium methylate and manganese chloride-sodium phenolate; and cobalt salt-tert. amine.

With reference to reaction temperature of oxidative polymerization for obtaining polyphenylene ether, it is known that there are differences in properties between polyphenylene ethers obtained by the polymerization at a temperature higher than 40° C. (high temperature polymerization) and obtained by the polymerization at a temperature of 40° C. or lower (low temperature polymerization), but either the high temperature polymerization or the low temperature polymerization may be employed in the present invention.

The polyphenylene ether used in the present invention includes graft copolymers of the above-mentioned polyphenylene ethers with styrene polymers or other polymers. As process for producing such graft copolymers, mention may be made of a process which comprises organic peroxide graft copolymerization of a styrene monomer and/or other polymerizable monomer in the presence of polyphenylene ether (Japanese Patent Kokoku Nos. 7-47862, 48-12197, 49-5623, 52-38596 and 52-30991) and a process which comprises melt kneading the above-mentioned polyphenylene ether, a polystyrene polymer and a radical forming agent (Japanese Patent Kokai No. 52-142799).

Styrene resins (I) used in the present invention are specifically polymers having one or more units selected from styrene, $\alpha$-methylstyrene, p-methylstyrene and the like. Typical examples thereof are polystyrene, rubber reinforced polystyrene, poly $\alpha$-methylstyrene, poly p-methylstyrene and styrene-acrylonitrile copolymer.

The polyamide resin (I) used in the present invention is at least one polyamide resin selected from aliphatic polyamide, thermoplastic aromatic copolyamide and aromatic nuclear-hydrogenated copolyamide. Specific examples are the following polyamides.

Aliphatic polyamides: Those which have a molecular weight of about 10,000 or more and can be produced by bonding of equimolar of a saturated aliphatic dicarboxylic acid of 4–12 carbon atoms and an aliphatic diamine of 2–12 carbon atoms. In the production, if necessary, the diamine may be excessively used so as to provide more amine terminal groups than carboxyl terminal groups in the polyamide, or alternatively, dibasic acid may be used so as to provide excessive acid groups. Similarly, these polyamides can be conveniently produced from acid production derivatives and amine production derivatives such as esters, acid chlorides and amine salts of the above acids and amines. Typical examples of the aliphatic dicarboxylic acid used for production of the polyamides are adipic acid, pimelic acid, azelaic acid, suberic acid, sebacic acid and dodecanedioic acid. On the other hand, typical examples of the aliphatic diamines are hexamethylenediamine and octamethylenediamine. In addition, these polyamides may also be produced by self-condensation of lactam.

Examples of these aliphatic polyamides are polyhexamethylene adipamide (nylon 66), polyhexamethylene azelamide (nylon 69), polyhexamethylene sebacamide (nylon 610), polyhexamethylene dodecanamide (nylon 612), poly-bis-(p-aminocyclohexyl)methane dodecanamide, polytetramethylene adipamide (nylon 46), and polyamides produced by ring cleavage of lactam such as polycaprolactam (nylon 6) and polylauryl lactam. Furthermore, there may be used polyamides produced by polymerization of at least two amines or acids selected from those used for production of the above-mentioned polymers, for example, polymers produced from adipic acid, sebacic acid and hexamethylenediamine. The aliphatic polyamides such as a blend of nylon 6 and nylon 66 include copolymers such as nylon 66/6. The aliphatic polyamides used here are preferably polyhexamethylene adipamide (nylon 66), polycaprolactam (nylon 6) or a blend of polyhexamethylene adipamide (nylon 66) and polycaprolactam (nylon 6).

Thermoplastic aromatic copolyamides: These are copolyamides containing an aromatic component such as polyhexamethyleneisophthalamide (nylon 6I). These thermoplastic copolyamides containing aromatic component mean melt-polymerizable polyamides which contain as a main component an aromatic amino acid and/or an aromatic dicarboxylic acid such as para-aminomethylbenzoic acid, para-aminoethylbenzoic acid, terephthalic acid and isophthalic acid.

Diamines which may constitute another component of the polyamide include hexamethylenediamine, undecamethylenediamine, dodecamethylenediamine, 2,2,4-/2,4,4-trimethylhexamethylenediamine, m-xylylenediamine, p-xylylenediamine, bis(p-aminocyclohexyl)methane, bis(p-aminocyclohexyl)propane, bis(3-methyl-4-aminocyclohexyl) methane, 1,3-bis(aminomethyl)cyclohexane and 1,4-bis(aminomethyl)cyclohexane. An isocyanate may also be used in place of the diamine.

Any other comonomers may be used, if necessary. Examples of the comonomers are 4,4'-diphenylmethane diisocyanate and tolylene diisocyanate. Other examples thereof are a unit of lactam, a unit of ω-amino acid of 4–12 carbon atoms, a compound derived from an aliphatic dicarboxylic acid of 4–12 carbon atoms and an aliphatic diamines of 2–12 carbon atoms, for example, lactams and amino acids such as 68 -caprolactam, ω-laurolactam, 11-aminoundecanoic acid and 12-aminododecanoic acid, and equimolar salts of the above-mentioned various diamines and adipic acid, azelaic acid or sebacic acid.

Typical examples of the thermoplastic aromatic copolyamides comprising these components are copolymer polyamide of p-aminomethylbenzoic acid and ε-caprolactam (nylon AHBA/6), polyamides mainly composed of 2,2,4-/2,4,4-trimethylhexamethylenediamine.terephthalate (nylon THDT and nylon THDT/6I), polyamides mainly composed of hexamethylenediamine isophthalate and/or hexamethylenediamine.terephthalate and containing, as a comonomer, bis(p-aminocyclohexyl)methane.isophthalate and/or bis(p-aminocyclohexyl)methane.terephthalate, bis(3-methyl-4-aminocyclohexyl) methane.isophthalate and/or bis(3-methyl-4-aminocyclohexyl)methane.terephthalate or bis(p-aminocyclohexyl)propane.isophthalate and/or bis(p-aminocyclohexyl)propane terephthalate (nylon 6I/PACM I, nylon 6I/DMPACM I, nylon 6I/PACP I, nylon 6I/6T/PACM I/PACM T, nylon 6I/6T/DMPACM I/DMPACM T, nylon 6I/6T/PACP I/PACP T), polyamides mainly composed of hexamethylenediamine.isophthalate or hexamethylenediamine.terephthalate and containing, as a comonomer, ε-caprolactam, 12-aminododecanoic acid, hexamethylenediamine adipate, bis(p-aminocyclohexyl)methane.adipate or bis(3-methyl,4-aminocyclohexyl)methane.adipate (nylon 6I, 6I/6T, 6I/12, 6T/6, 6T/66, 6I/PACM 6,6I/DMPACM 6), and polyamides mainly composed of bis(p-aminocyclohexyl)methane.isophthalate or bis(3-methyl,4-aminocyclohexyl)methane.isophthalate and containing, as a comonomer, hexamethylenediamine.dodecanedioate or 12-aminododecanoic acid (nylon PACM I/612 and nylon DMPACM I/12).

The aromatic nuclear-hydrogenated copolyamides: There are alicyclic copolyamides obtained by using cyclohexane 1,4-dicarboxylic acid or cyclohexane 1,3-dicarboxylic acid obtained by nuclear-hydrogenation of terephthalic acid or isophthalic acid in place of terephthalic acid or isophthalic acid which is an acid component of the above-mentioned aromatic copolyamides. Furthermore, nuclear-hydrogenation product of diamines or diisocyanates such as 4,4'-diphenylmethane diisocyanate or tolylene diisocyanate, may also be used as a monomer.

In the present invention, polyamides having a relative viscosity of less than 2.5 (measured at 25° C. in a solution containing 1 g of polyamide in 100 cc of 98% concentrated sulfuric acid as a solvent) are preferred. That is, polyamides having low viscosity (less than 2.5 in relative viscosity) are preferred because when an inorganic filler is blended in a polyphenylene ether-polyamide composition, melt viscosity at molding increases and flowability decreases.

In the present invention, as the rubber-like materials (II), there may be used elastomers and/or polyolefin resins having low flexural modulus, and/or modified rubber-like materials.

Examples of the rubber-like materials are ethylene propylene rubber, ethylene propylene non-conjugated diene rubber, ethylene butene rubber, propylene butene rubber, isoprene butylene rubber, polyisoprene, polybutadiene, styrene butadiene rubber, styrene butadiene styrene block copolymer, partially hydrogenated styrene butadiene block copolymer, styrene isoprene block copolymer, partially hydrogenated styrene isoprene block copolymer, thiokol rubber, polysulfide rubber, polyurethane rubber, polyether rubber (such as polypropylene oxide), epichlorohydrin rubber, polyester elastomer, polyamide elastomer, linear low-density polyethylene and mixture thereof.

The modified rubber-like materials are those obtained by modifying the above-mentioned rubber-like materials with the compatibilizing agent. Examples of the modified rubber-like materials are maleic anhydride grafted ethylene propylene rubber, maleic anhydride grafted styrene butadiene styrene block copolymer, maleic anhydride grafted partially hydrogenated styrene butadiene block copolymer, maleic anhydride grafted partially hydrogenated styrene-isoprene block copolymer and glycidyl methacrylate grafted ethylene propylene rubber.

The rubber-like material further includes copolymers with the compatibilizing agent such as ethylene-acrylate-maleic anhydride copolymer, ethylene-acrylate-glycidyl methacrylate copolymer, ethylene-vinyl acetate-glycidyl methacrylate copolymer and mixtures thereof.

Among them, preferred are ethylene propylene rubber, ethylene butene rubber, styrene butadiene block copolymer, partially hydrogenated styrene butadiene block copolymer, styrene isoprene block copolymer, partially hydrogenated styrene isoprene block copolymer, linear low-density polyethylene having a density of 0.885–0.935 g/cm$^3$, preferably 0.885–0.925 g/cm$^3$, ethylene-methyl acrylate-maleic anhydride copolymer, ethylene-ethyl acrylate-maleic anhydride copolymer, ethylene-vinyl acetate-glycidyl methacrylate copolymer, ethylene-methyl acrylate-glycidyl methacrylate copolymer and mixtures thereof.

Examples of the compound (A) used as the compatibilizing agent (IV) in the present invention which has in its molecule both (a) carbon-carbon double bond or carbon-carbon triple bond and (b) at least one functional group selected from carboxyl group, acid anhydride group, amino group, acid amide group, imido group, epoxy group, carboxylate group, isocyanate group, methylol group, and hydroxyl group are maleic anhydride, maleic acid, fumaric acid, maleimide, maleic hydrazide, reaction products of maleic anhydride and diamines, e.g., those having the structure represented by

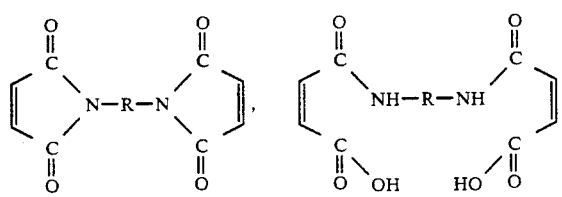

wherein R represents an aliphatic or aromatic group, methyl nadic anhydride, dichloromaleic anhydride, maleinamide, natural fats and oils such as soybean oil, tung oil, caster oil, linseed oil, hempseed oil, cottonseed oil, sesame oil, rapeseed oil, peanut oil, tsubaki oil, olive oil, coconut oil and sardine oil, epoxidized natural fats and oils such as epoxidized soybean oil, unsaturated carboxylic acids such as acrylic acid, butenoic acid, crotonic acid, vinylacetic acid, itaconic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracosenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linolic acid, linoleic acid, octadecatrienoic acid, eicosadienoic acid, eicosatrienoic acid, eicosatetraenoic acid, ricinoleic acid, eleostearic acid, oleic acid, eicosapentaenoic acid, erucic acid, docosadienoic acid, docosatrienoic acid, docosatetraenoic acid, docosapentaenoic acid, tetracosenoic acid, hexacosenoic acid, hexacodienoic acid, octacosenoic acid and tetracontenoic acid, and esters, acid amides and anhydrides of these unsaturated carboxylic acids; unsaturated alcohols such as allyl alcohol, crotyl alcohol, methylvinylcarbinol, allylcarbinol, methylpropenylcarbinol, 4-pentene-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol, alcohols represented by the formulas $C_nH_{2n-5}OH$, $C_nH_{2n-7}OH$, and $C_nH_{2n-9}OH$ (wherein n is a positive integer), 3-butene-1,2-diol, 2,5-dimethyl-3-hexene-2,5-diol, 1,5-hexadiene-3,4-diol and 2,6-octadiene-4,5-diol; unsaturated amines prepared by substituting the OH group of the above unsaturated alcohols with —NH$_2$ group, glycidyl acrylate, glycidyl methacrylate, and allyl glycidyl ether.

It is needless to say that the compound (A) includes compounds containing two or more double bonds or triple bonds of the above group (a) and two or more identical or different functional groups of the above (b). Furthermore, it is also possible to use as the compound (A) two or more of the above-mentioned compounds in combination.

Suitably, the compound (A) are maleic anhydride, maleic acid, fumaric acid, itanconic acid, himic anhydride, glycidyl acrylate, glycidyl methacrylate and allyl glycidyl ether.

Examples of compound (B) used as compatibilizing agent (IV) are citric acid, malic acid and calcium or potassium salts thereof.

Examples of compound (C) used as compatibilizing agent (IV) are reaction products of polyphenylene ether with, for example, chloroethianoylsuccinic anhydride, acid chloride of trimellitic anhydride, chloroformylsuccinic anhydride, 1-acetoxyacetyl-3,4-dibenzoic anhydride or acid chloride of terephthalic acid. The resulting compounds can be purified by precipitation in methanol or acetone. These modifiers can be used in combination with primary or secondary amines such as butylamine, dibutylamine and n-octadecylamine.

Examples of compound (D) used as compatibilizing agent IV are γ-aminopropyltriethoxysilane, vinyltris(2-methoxyethoxy)silane, 5-(bicycloheptenyl)triethoxysilane and γ-mercaptopropyltrimethoxysilane.

Oxidized polyolefin wax used as compound (E) of compatibilizing agent (IV) is usually prepared by oxidation of polyolefin wax in air or in suspension.

Examples of compound (F) used as compatibilizing agent (IV) are styrene-maleic anhydride copolymer, styrene-maleic anhydride-methacrylate terpolymer, styrene-maleic anhydride-acrylate terpolymer and these compounds modified with rubbers.

Examples of compound (G) used as compatibilizing agent (IV) are products obtained by reaction of (a) 1,2 substituted olefin such as maleic anhydride, maleic acid, fumaric acid or the like with (b) polyphenylene ether by melt-kneading in the presence or absence of (c) peroxide such as benzoyl peroxide.

The above are examples of compatibilizing agent.

Among them, compounds (A) are preferred. Among compounds (A), preferred are maleic anhydride, maleic acid, fumaric acid, itaconic acid, himic anhydride, glycidyl acrylate, glycidyl methacrylate and allylglycidyl ether as referred to above.

The inorganic filler (III) used in the present invention includes talc (magnesium silicate), clay (aluminum silicate), zinc oxide, titanium oxide and calcium carbonate.

These inorganic fillers preferably have an average particle size of 5.0 μ or less, more preferably having an average particle size of 5.0 μ or less and an aspect ratio of 5 or more. Preferred inorganic filler is talc. Inorganic fillers of more than 5.0 μ in average particle size cause much reduction in impact strength of the resulting thermoplastic resin composition and besides results in poor appearance such as surface gloss and furthermore cause reduction in weld strength of molded articles. If aspect ratio of the filler is less than 5, improvement of flexural modulus of the composition is insufficient. Preferred inorganic filler is talc having an average particle size of 5.0 μ or less and an aspect ratio of 5 or more. The "average particles size" used here is measured from a particle size distribution measured by sedimentation method and is a particle size corresponding to its cumulative distribution of 50%. These inorganic fillers may be used without any treatment, but may be surface treated with various silane coupling agent, titanium coupling agent, higher fatty acids, higher fatty acid esters, higher fatty acid amides, higher fatty acid salts and other surface active agents for improving dispersibility and interfacial adhesion to polyphenylene ether resin and nylon resin.

More preferred inorganic filler is a talc of 0.2% by weight or less in weight loss on heating at 300° C. for 2 hours.

The composition of polyphenylene ether and polyamide of the present invention is usually subjected to injection molding or extrusion molding at 280°-320° C. Therefore, if content of water in the inorganic filler is high (weight loss on heating >0.2% by weight), the resulting molded articles have poor appearance such as silver streaks. In general, talc is incorporated in polypropylene resin, nylon resin, etc. for molding in order to improve rigidity and heat resistance. However, molding temperature for polypropylene resin is at highest 230°-240° C. and that for nylon resin is also 260°-270° C. and hence the phenomena to cause poor appearance are less.

In order to prevent the phenomena, the composition (pellets) is previously dried at 80°-110° C. for 1-2 hours, but it is not easy to remove water confined in the pellets.

In order to accomplish another object of the present invention, namely, to improve dimensional stability, heat resistance and flexural rigidity of a composition of polyphenylene ether and polyamide with retaining impact strength and processability of the composition, various inorganic fillers have been examined and as a result it has been found that talc having an average particle diameter of 5.0 μ or less, preferably 4.0 μ or less is preferred for balancing the above properties.

Glass fiber is used in combination with the inorganic filler or is used alone in the present invention. From the points of dimensional stability, heat resistance, rigidity and appearance, it is preferred to use the glass fiber in combination with the inorganic filler. As glass fiber, there may be used chopped strands of 15 μ or less in diameter and 6 mm or less in length. If the diameter is more than 15 μ, improvement in mechanical strength is not high and warpage occurs much at molding. It is preferred to use glass fibers of 10 μ or less in diameter and 3 mm or less in length. From the points of appearance, rigidity and warpage or deformation, it is more preferred to use glass fibers of high aspect ratio in an amount as small as possible. Therefore, more preferable glass fibers are those of 6 μ or less in diameter and 3 mm or less in diameter. Glass fibers may be used in combination with various coupling agents in order to improve interfacial adhesion to polyphenylene ether resin and/or polyamide resin and to improve dispersibility. The coupling agent usually includes those of silane and titanium types. Especially preferred are silane coupling agents, for example, epoxysilane such as γ-glycidoxypropyltrimethoxysilane, vinylsilane such as vinyltrichlorosilane and aminosilane such as γ-aminopropyltriethoxysilane.

Blending ratio of the components in the present invention are as follows:

(1) Blending ratio of polyphenylene ether resin, a mixture of polyphenylene ether resin and styrene resin or a graft copolymer of polyphenylene ether resin and styrene and polyamide resin is preferably 5-95% by weight : 95-5% by weight. The desired effects of the present invention cannot be obtained if the ratio is outside the above range. More preferably, the ratio is 30-70% by weight : 70-30% by weight.

(II) Amount of the rubber-like material is preferably 0-50 parts by weight per 100 parts by weight of the resin (I) comprising polyphenylene ether and polyamide resin. When the rubber-like material is not contained, impact strength is inferior, but heat resistance, rigidity and dimensional stability are improved. If amount of the rubber-like material is more than 50 parts by weight, heat resistance is extremely reduced and this is not preferred. More preferred range is 0-30 parts by weight.

(IV) Addition amount of compound as compatibilizing agent is 0.01-10 parts by weight per 100 parts by weight of the resin (I). If it is less than 0.01 part by weight, the effects aimed at by the present invention cannot be obtained and if more than 10 parts by weight, appearance is inferior.

(III) Addition amount of inorganic filler and/or glass fiber is 2.0-50 parts by weight per 100 parts by weight of the resin (I). When the amount is less than 2.0 parts by weight, the effects aimed at by the present invention cannot be obtained and when more than 50 parts by weight, appearance becomes inferior. Preferred rang is 2.0-30 parts by weight. In case of using inorganic filler in combination with glass fiber, ratio of inorganic filler and glass fiber is 20-80% by weight of inorganic filler and 80-20% by weight of glass fiber.

Reduced viscosity (ηsp/c) of polyphenylene ether resin used for the resin (I) is 0.25-0.65 dl/g, preferably 0.35-0.60 dl/g.

If necessary, the thermoplastic resin composition of the present invention may further contain pigment, ultraviolet absorber, thermal stabilizer, flame retardant, antioxidant, plasticizer or the like.

There is no special limitation in the method for blending of polyphenylene ether, mixture of polyphenylene ether and styrene resin or graft copolymer of polyphenylene ether resin and styrene (I-1), polyamide resin (I-2), rubber-like material (II), inorganic filler (III-1), glass fiber (III-2) and compatibilizing agent (IV) and known melt kneading method can be employed. Extruders, kneaders, rolls and the like, preferably extruders can be used as melt kneading apparatuses. There is no special limitation in sequence of addition of the components upon melt kneading. That is, there are a method which comprises adding all of the components (I-1), (I-2), (II), (III-1) and/or (III-2) and (IV) at the same time and simultaneously melt-kneading them, a method which comprises previously melt kneading the components (I-1) and (IV) in the presence or absence of a free-radical initiator and then adding components (I-2), (II), (III-1) and/or (III-2) and melt kneading them, a method which comprises previously melt kneading components (I-1), (II) and (IV) in the presence or absence of a free-radical initiator and then adding components (I-2), (III-1) and/or (III-2) and melt kneading them, a method which comprises previously melt kneading components (I-1), (II), (IV) and (III-1) and/or (III-2) in the presence or absence of a free-radical initiator and then adding (I-2) and melt kneading them, and a method which comprises previously melt kneading (I-1), (II), and (IV), then adding (I-2) and kneading them, further adding components (III-1) and/or (III-2) and melt kneading them.

The kneaded resin composition is molded by various molding methods such as injection molding, extrusion molding and the like. The resin composition of the present invention can be used as shaped articles, sheets, tubes, films, fibers, laminates and coating materials made by injection molding or extrusion molding.

The molded products obtained from the thermoplastic resin composition of the present invention can be used suitably for automobile parts and electrical and electronic parts.

As examples of automobile parts to which the composition of the present invention can be applied, mention may be made of exterior trim parts such as bumper, fender, apron, hood panel, fascia, rocker panel, rocker panel reinforce, floor panel, rear quarter panel, door panel, door support, roof top, fuel lid, and trunk lid; interior trim parts such as instrument panel, console box, glove box, shift knob, pillar garnish, door trim, handle, arm rest, wind louver, carpet, head rest, seat belt and seat; interior parts of engine room such as distributor cap, air cleaner, radiator tank, battery case, radiator shroud, washer tank, cooling fan and heater case; mirror body, wheel cover, trunk mat and gasoline tank.

Furthermore, examples of motorcycle parts to which the composition of the present invention can be applied are cowling materials, muffler covers and leg shields. Examples of electrical and electronic parts to which the composition can be applied are housings, chassis, connectors, print substrates and pulleys. Further, the composition can be used for parts which are required to have strength and heat resistance.

The following nonlimiting examples will explain the present invention in more detail.

The following test methods were employed in the examples.

Heat distortion temperature (HDT): This was measured according to ASTM D648.

Izod impact strength: This was measured according to ASTM D256. Thickness of test piece was 3.2 mm with knotch.

M. I. (melt index): This was measured according to ASTM D1238 under load of 10 kg.

Flexural modulus: This was measured according to ASTM D790.

Linear expansion coefficient: This was measured according to ASTM D696. The results were employed as criteria for dimensional stability. Measurement was conducted at $-20°$ to $80°$ C.

Appearance: Appearance of injection molded article was observed and examined on the presence of bubbling and silver streaks. The results are indicated by the following criteria:

Neither bubbling nor silver streaks were present : "O"

Bubbling and silver streaks were present : "X"

Reduced viscosity ($\eta sp/c$) of polyphenylene ether used in the examples was 0.5 dl/g which was measured in chloroform solution at $25°$ C.

Polyphenylene ether and rubber-like material modified were obtained by the following methods.

(1) Polyphenylene ether (PPE): This was obtained by dissolving 2,6-dimethylphenol in toluene and methanol, adding thereto manganese chloride-ethylenediamine and carrying out oxidative polymerization at $30°$ C. in oxygen atmosphere.

With reference to polyamide and rubber-like material, commercially available products were used.

(2) Modified rubber-like material (a) MAH-EPR

Ethylenepropylene rubber (SUMITOMO ESPREIN® E120P manufactured by Sumitomo Chemical Co., Ltd.), maleic anhydride and tert-butyl peroxylaurate were previously mixed. The mixture was subjected to reaction in an extruder of 30 mm in screw diameter and L/D=28 set at $230°$ C. of barrel temperature at a screw speed of 60 rpm and modified rubber strands extruded from die were cooled with water and then pelletized. Grafting amount of maleic anhydride was 1.5 wt. % (based on rubber).

EXAMPLE 1

Forty (40) parts by weight of polyphenylene ether, 8 parts by weight of maleic anhydride grafted ethylene-propylene rubber (MAH-EPR), 0.4 part by weight of maleic anhydride and 4 parts by weight of talc (I) were fed from the first hopper of a continuous twin-screw kneader (TEM-50 manufactured by Toshiba Machine Co., Ltd.) and 48 parts by weight of polyamide (UNITIKA NYLON® A1030BRL) was fed from the second hopper provided between the first hopper and a vent using a metering feeder and these were melt kneaded and granulated at a cylinder temperature of $260°$ C. and at a screw speed of 380 rpm. The granules were molded into test pieces by injection molding machine (TS-150E manufactured by Toshiba Machine Co., Ltd.). The test pieces were subjected to measurement of properties and appearance. The results are shown in Table 1.

EXAMPLE 2

Example 1 was repeated except that polyphenylene ether was used in an amount of 36 parts by weight and 4 parts by weight of glass fiber was fed from the third hopper provided between the second hopper and a vent provided downstream the second hopper.

EXAMPLE 3

Thirty (30) parts by weight of polyphenylene ether, 0.4 part by weight of maleic anhydride and 15 parts by weight of talc (I) were fed from the first hopper of the continuous twin-screw kneader used in Example 1 and 55 parts by weight of polyamide (UNITIKA NYLON® A1030BRL) was fed from the second hopper. Granulation, molding into test pieces, and measurement of properties and appearance were conducted in the same manner as in Example 1.

EXAMPLE 4

Twenty (20) parts by weight of polyphenylene ether, 0.2 part by weight of maleic anhydride, and 30 parts by weight of talc (I) were fed from the first hopper and 50 parts by weight of polyamide (UNITIKA NYLON®

A1030BRL) was fed from the second hopper, and granulation, molding and measurement of properties and appearance were conducted in the same manner as in Example 1.

COMPARATIVE EXAMPLE 1

Example 3 was repeated except that talc (II) was used in place of talc (I).

EXAMPLE 5

Example 3 was repeated except that talc (III) was used in place of talc (I).

EXAMPLE 6

Twenty-four (24) parts by weight of polyphenylene ether, 8 parts by weight of SBS, 0.4 part by weight of maleic anhydride and 15 parts by weight of talc (III) were fed from the first hopper, 48 parts by weight of polyamide (UNITIKA NYLON® A1030BRL) was fed from the second hopper and 5 parts by weight of glass fiber was fed from the third hopper. Granulation, molding, and measurement of properties and appearance were conducted in the same manner as in Example 1.

EXAMPLE 7

Example 6 was repeated except that talc (III) was used in an amount of 5 parts by weight and glass fiber was used in an amount of 15 parts by weight.

COMPARATIVE EXAMPLE 2

Thirty (30) parts by weight of polyphenylene ether, 0.4 part by weight of maleic anhydride and 35 parts by weight of talc (III) were fed from the first hopper and 35 parts by weight of polyamide (UNITIKA NYLON® A1030BRL) was fed from the second hopper. Granulation, molding and measurement of properties and appearance were conducted in the same manner as in Example 1.

COMPARATIVE EXAMPLE 3

Twenty (20) parts by weight of polyphenylene ether, 30 parts by weight of SBS, 0.4 part by weight of maleic anhydride and 15 parts by weight of talc (III) were fed from the first hopper and 35 parts by weight of polyamide (UNITIKA NYLON® A1030BRL) was fed from the second hopper. Granulation, molding and measurement of properties and appearance were conducted in the same manner as in Example 1.

EXAMPLE 8

Example 5 was repeated except that UNITIKA NYLON® A1025 was used in place of UNITIKA NYLON® A1030BRL as polyamide.

COMPARATIVE EXAMPLE 4

Example 8 was repeated except that maleic anhydride was not used.

COMPARATIVE EXAMPLE 5

Example 1 was repeated except that talc (I) was not used.

EXAMPLE 9

Forty (40) parts by weight of polyphenylene ether and 0.4 part by weight of maleic anhydride were fed from the first hopper, 40 parts by weight of polyamide (UNITIKA NYLON° A1030BRL) was fed from the second hopper, 20 parts by weight of glass fiber was fed from the third hopper, and granulation, molding and measurement of properties and appearance were conducted in the same manner as in Example 1.

As shown in Example 3 and Comparative Example 1 in Table 1, when talc of 5.0 μ or less in average particle size (MICRON WHITE® 5000S) was used, the products were excellent in impact strength and appearance. When average particle size exceeded 5.0 μ, impact strength was deteriorated and appearance was poor.

As shown in Comparative Example 2, when the amount of talc was more than 50 parts by weight per 100 parts by weight of the total of polyphenylene ether and polyamide, linear expansion coefficient was low (good in dimensional stability), but flowability decreased to cause poor appearance.

As shown in Comparative Example 3, when the amount of rubber-like material exceeded 50 parts by weight per 100 parts by weight of the total polyphenylene ether and polyamide, impact strength was improved, but heat resistance and flexural modulus decreased and poor appearance was brought about.

As shown in Example 8 and Comparative Example 4, when maleic anhydride was not contained as in Comparative Example 4, decrease in impact strength and heat resistance resulted and appearance was considerably poor.

When talc was not contained as in Comparative Example 5, impact strength was high and appearance was good, but flexural modulus was low and linear expansion coefficient was great and thus dimensional stability was poor.

As explained above, the present invention can provide a filler-containing polyphenylene ether polyamide resin composition well balanced in dimensional stability, rigidity, heat resistance and impact strength.

TABLE 1

| | | Example | | | | | | |
|---|---|---|---|---|---|---|---|---|
| | | 1 | 2 | 3 | 4 | 5 | 6 | 7 |
| Formulation | PPE | 40 | 36 | 30 | 20 | 30 | 24 | 24 |
| | SBS | | | | | | 8 | 8 |
| | MAHEPR | 8 | 8 | | | | | |
| | Nylon 6 (I) | 48 | 48 | 55 | 50 | 55 | 48 | 48 |
| | Nylon 6 (II) | | | | | | | |
| | Maleic anhydride | 0.4 | 0.4 | 0.4 | 0.2 | 0.4 | 0.4 | 0.4 |
| | Talc (I) | 4 | 4 | 15 | 30 | | | |
| | Talc (II) | | | | | | | |
| | Talc (III) | | | | | 15 | 15 | 5 |
| | Glass fiber | | 4 | | | | 5 | 15 |
| Properties | M I (280° C./10 kg) | 30 | 30 | 50 | 43 | 48 | 23 | 25 |
| | Flexural modulus | 24,000 | 28,000 | 31,000 | 37,000 | 31,000 | 32,000 | 36,000 |

TABLE 1-continued

|  |  | | | | | | | |
|---|---|---|---|---|---|---|---|---|
| ties | (kg/cm$^2$) | | | | | | | |
|  | H.D.T. (18.6 kg/cm$^2$) (°C.) | 100 | 141 | 150 | 155 | 152 | 158 | 170 |
|  | Izod impact strength (23° C.) | 20 | 12 | 6 | 4 | 6 | 10 | 7 |
|  | Linear expansion coefficient ($\times 10^{-5}$) | 8.1 | 7.3 | 6.5 | 5.3 | 6.4 | 6.6 | 3.8 |
|  | Appearance | ○ | ○ | ○ | ○ | ○ | ○ | ○ |

|  |  | Example | | Comparative Example | | | | |
|---|---|---|---|---|---|---|---|---|
|  |  | 8 | 9 | 1 | 2 | 3 | 4 | 5 |
| For- | PPE | 30 | 40 | 30 | 30 | 20 | 30 | 40 |
| mu- | SBS |  |  |  |  | 30 |  |  |
| la- | MAHEPR |  |  |  |  |  |  | 8 |
| tion | Nylon 6 (I) |  | 40 | 55 | 35 | 35 |  | 48 |
|  | Nylon 6 (II) | 55 |  |  |  |  | 55 |  |
|  | Maleic anhydride | 0.4 | 0.4 | 0.4 | 0.4 | 0.4 | — | 0.4 |
|  | Talc (I) |  |  |  |  |  |  |  |
|  | Talc (II) |  |  | 15 |  |  |  |  |
|  | Talc (III) | 15 |  |  | 35 | 15 | 15 |  |
|  | Glass fiber |  | 20 |  |  |  |  |  |
| Prop- | M I (280° C./10 kg) | 63 | 40 | 53 | 13 | 8 | 55 | 40 |
| er- | Flexural modulus (kg/cm$^2$) | 31,000 | 50,000 | 31,000 | 39,000 | 20,000 | 21,000 | 21,000 |
| ties | H.D.T. (18.6 kg/cm$^2$) (°C.) | 150 | 190 | 150 | 175 | 90 | 92 | 110 |
|  | Izod impact strength (23° C.) | 5 | 7 | 1 | 2 | 50 | 0.5 | 25 |
|  | Linear expansion coefficient ($\times 10^{-5}$) | 6.5 | 3.5 | 6.9 | 5.0 | 8.5 | 6.6 | 9.0 |
|  | Appearance | ○ | ○ | X | X | X | X | ○ |

Notes:
Talc (I): MICRONWHITE ® 5000S (manufactured by Hayashi Kasei Co.; average particle size: 2.55μ; loss in weight on heating*: 0.16%; aspect ratio > 5)
*300° C., 2 hr
Talc (II): TALCAN POWDER ® PKN (manufactured by Hayashi Kasei Co.; average particle size; 8.0μ; aspect ratio > 5)
Talc (III): MICRONWHITE ® 5000P (manufactured by Hayashi Kasei Co,; average particle size: 2.43μ; loss in weight on heating*: 0.15%; aspect ratio > 5)
*300° C., 2 hr
SBS: TR1101 (manufactured by Shell Chemical Co.; styrene-butadiene styrene block copolymer)
Glass fiber: CS-03-MA 411 (manufactured by Asahi Fiber Glass Co.)
Nylon 6 (I): UNITIKA NYLON ® A1030BRL (relative viscosity 2.6)
Nylon 6 (II): UNITIKA NYLON ® A1025 (relative viscosity 2.3)

We claim:

1. A thermoplastic resin composition which comprises (I) 100 parts by weight of a resin comprising 5–95% by weight of a polyphenylene ether resin, a mixture of a polyphenylene ether resin and a styrene resin or a graft polymer of a polyphenylene ether resin and styrene and 95–5% by weight of polyamide resin, (II) 0–50 parts by weight of a rubber-like material, (III) 2.0–50 parts by weight of an inorganic filler having an average particle size of 5.0 μ or less and (IV) 0.01–10 parts by weight of at least one compatibilizing agent which improves compatibility between the polyphenylene ether resin and the polyamide resin.

2. A thermoplastic resin composition according to claim 1, wherein the inorganic filler (III) has an average particle size of 5.0 μ or less and an aspect ratio of 5 or higher.

3. A thermoplastic resin composition according to claim 2, wherein the inorganic filler (III) is talc.

4. A thermoplastic resin composition according to claim 1, wherein the compatibilizing agent is at least one compound selected from the group consisting of the following (A)–(G):

(A) Compounds having in their molecule both (a) carbon-carbon double bond or carbon-carbon triple bond and (b) carboxyl group, acid anhydride group, amino group, acid amide group, imido group, epoxy group, carboxylate group, isocyanate group, methylol group or hydroxyl group;

(B) Aliphatic polycarboxylic acids represented by the formula: $(R^{I}O)_mR(COOR^{II})_n(CONR^{III}R^{IV})_s$ [wherein R is a straight chain or branched chain saturated aliphatic hydrocarbon group of 2–20 carbon atoms: $R^I$ is a hydrogen atom, or an alkyl, aryl, acyl or carbonyldioxy group which has 1–10 carbon atoms; each $R^{II}$ is independently a hydrogen atom or an alkyl or aryl group which has 1–20 carbon atoms; $R^{III}$ and $R^{IV}$ are independently a hydrogen atom or an alkyl or aryl group which has 1–10 carbon atoms; m=1, (n+s)≧2, n≧0 and s≧0; and ($OR^I$) is on α or β position relative to carbonyl group and at least two carbonyl groups are separated by 2–6 carbon atoms] or derivatives thereof or reaction products thereof;

(C) Functional polyphenylene ethers comprising reaction products of (a) polyphenylene ether and (b) a compound of the formula: (i)—Z—(ii) [wherein (i) is a group of the formula: [X—C(O)—]— (wherein X is F, Cl, Br, I, OH, —OR or —O—C(O)—R where R is H, an alkyl group or an aryl group), (ii) is a carboxylic acid group, an acid anhydride group, an acid amide group, an imido group, a carboxylate group, an amino group or a hydroxyl group, (i) and (ii) are covalently bonded through a bridge Z, and Z is a divalent hydrocarbon group];

(D) Organo silane compounds having in molecular structure both (a) at least one silicon bonded to carbon through an oxygen link and (b) at least one ethylenic carbon-carbon double bond or carbon-carbon triple bond and/or functional group selected from the group consisting of an amino group and a mercapto group, in which the functional group is not bonded directly to the silicon atom;

(E) Oxidized polyolefin waxes;

(F) Copolymers having unit of vinyl-aromatic compound and unit of α,β-unsaturated dicarboxylic acid or dicarboxylic anhydride or copolymers having unit of vinyl aromatic compound and unit of α,β-unsaturated dicarboxylic imido compound; and (G) At least one compound selected from the group consisting of a reaction product of (a) a 1,2-substituted olefin compound having a carboxyl group or an acid anhydride group, (b) polyphenylene ether and (c) a free-radical initiator and a reaction product of (a) and (b) in the absence of (c).

5. A thermoplastic resin composition according to claim 1, wherein the polyphenylene ether resin (I) is poly(2,6-dimethyl-1,4-phenylene) ether.

6. A thermoplastic resin composition according to claim 1, wherein the styrene resin (I) is homopolystyrene or rubber reinforced polystyrene.

7. A thermoplastic resin composition according to claim 1, wherein the polyamide resin (I) is polyhexamethylene adipamide.

8. A thermoplastic resin composition according to claim 1, wherein the polyamide resin (I) is polyhexamethylene adipamide.

9. A thermoplastic resin composition according to claim 1, wherein the polyamide resin (I) is at least one polyamide resin selected from the group consisting of aliphatic polyamides, thermoplastic aromatic copolyamides and aromatic nuclear-hydrogenated copolyamides.

10. A thermoplastic resin according to claim 1, wherein the rubber-like material (II) is at least one material selected from the group consisting of ethylene-propylene rubber, ethylene-propylene-non-conjugated diene rubber, styrene-butadiene block copolymer, hydrogenated styrene-butadiene block copolymer, styrene-isoprene block copolymer, hydrogenated styrene-isoprene block copolymer, styrene grafted ethylene-propylene rubber, styrene grafted ethylene-propylene-non-conjugated diene rubber, and carboxyl group modified product and glycidyl group modified product thereof.

11. A thermoplastic resin composition according to claim 4, wherein the compatibilizing agent (IV) is maleic anhydride, maleic acid, fumaric acid, itaconic acid, himic anhydride, glycidyl acrylate or glycidyl methacrylate.

12. A thermoplastic resin composition according to claim 1, wherein the inorganic filler (III) is talc which has an average particle size of 5.0 μ or less and shows weight loss on heating of 0.2% by weight or less when heated at 300° C. for 2 hours.

13. A thermoplastic resin composition according to claim 1, wherein the polyamide resin (I) is a polyamide having a relative viscosity of less than 2.5.

14. A thermoplastic resin composition which comprises (I) 100 parts by weight of a resin comprising 5-95% by weight of a polyphenylene ether resin, a mixture of a polyphenylene ether resin and a styrene resin or a graft polymer of a polyphenylene ether resin and styrene and 95-5% by weight of polyamide resin, (II) 0-50 parts by weight of a rubber-like material, (III) 2.0-50 parts by weight of an inorganic filler having an average particle size of 5.0 μ or less and glass fiber and (IV) 0.01-10 parts by weight of at least on compatibilizing agent which improves compatibility between the polyphenylene ether resin and the polyamide resin.

15. A thermoplastic resin composition according to claim 14, wherein the inorganic filler (III) has an average particle size of 5.0 μ or less and an aspect ratio of 5 or higher.

16. A thermosplastic resin composition according to claim 14, wherein the inorganic filler (III) is talc.

17. A thermoplastic resin composition according to claim 14, wherein the compatibilizing agent is at least one compound selected from the group consisting of the following (A)-(G):

(A) Compounds having in their molecule both (a) carbon-carbon double bond or carbon-carbon triple bond and (b) carboxyl group, acid anhydride group, amino group, acid amide group, imido group, epoxy group, carboxylate group, isocyanate group, methylol group or hydroxyl group;

(B) Aliphatic polycarboxylic acids represented by the formula: $(R^{I}O)_{m}R(COOR^{II})_{n}(CONR^{III}R^{IV})_{s}$, wherein R is a straight chain or branched chain saturated aliphatic hydrocarbon group of 2-20 carbon atoms; $R^{I}$ is a hydrogen atom, or an alkyl, aryl, acyl or carbonyldioxy group which has 1-10 carbon atoms; each $R^{II}$ is independently a hydrogen atom or an alkyl or aryl group which has 1-20 carbon atoms; $R^{III}$ and $R^{IV}$ are independently a hydrogen atom or an alkyl or aryl group which has 1-10 carbon atoms; $m=1$, $(n+s)\geq 2$, $n\geq 0$ and $s\geq 0$; and $(OR^{I})$ is on α or β position relative to carbonyl group and at least two carbonyl groups are separated by 2-6 carbon atoms or derivatives thereof or reaction products thereof;

(C) Functionalized polyphenylene ethers comprising reaction products of (a) polyphenylene ether and (b) a compound of the formula: (i)—Z—(ii), wherein (i) is a group of the formula: X—C(O)—, wherein X is F, Cl, Br, I, OH, —OR or —O—C-(O)—R where R is H, an alkyl group or an aryl group), (ii) is a carboxylic acid group, an acid anhydride group, an acid amide group, an imido group a carboxylate group, an amino group or a hydroxyl group, (i) and (ii) are covalently bonded through a bridge Z, and Z is a divalent hydrocarbon group;

(D) Organo silane compounds having in molecular structure both (a) at least one silicon bonded to carbon through an oxygen link and (b) at least one ethylenic carbon-carbon double bond or carbon-carbon triple bond and/or functional group selected from the group consisting of an amino group and a mercapto group, in which the functional group is not bonded directly to the silicon atom;

(E) Oxidized polyolefin waxes;

(F) Copolymers having unit of vinyl-aromatic compound and unit of α,β-unsaturated dicarboxylic acid or dicarboxylic anhydride or copolymers having unit of vinyl aromatic compound and unit of α,β-unsaturated dicarboxylic imido compound; and (G) At least one compound selected from the group consisting of a reaction product of (a) a 1,2-substituted olefin compound having a carboxyl group or an acid anhydride group, (b) polyphenylene ether and (c) a free-radical initiator and a reaction product of (a) and (b) in the absence of (c).

18. A thermoplastic resin composition according to claim 14, wherein the polyphenylene ether resin (I) is poly(2,6-dimethyl-1,4-phenylene) ether.

19. A thermoplastic resin composition according to claim 14, wherein the styrene resin (I) is homopolystyrene or rubber reinforced polystyrene.

20. A thermoplastic resin composition according to claim 14, wherein the polyamide resin (I) is polycaprolactam.

21. A thermoplastic resin composition according to claim 14, wherein the polyamide resin (I) is polyhexamethylene adipamide.

22. A thermoplastic resin composition according to claim 14, wherein the polyamide resin (I) is at least one polyamide resin selected from the group consisting of aliphatic polyamides, thermoplastic aromatic copolyamides and aromatic nuclear-hydrogenated copolyamides.

23. A thermoplastic resin according to claim 14, wherein the rubber-like material (II) is at least one material selected from the group consisting of ethylene-propylene rubber, ethylene-propylene-non-conjugated diene rubber, styrene-butadiene block copolymer, hydrogenated styrene-butadiene block copolymer, styrene-isoprene block copolymer, hydrogenated styrene-isoprene block copolymer, styrene grafted ethylene-propylene rubber, styrene grafted ethylene-propylene-non-conjugated diene rubber, and carboxyl group modified product and glycidyl group modified product thereof.

24. A thermoplastic resin composition according to claim 14, wherein the compatibilizing agent (IV) is maleic anhydride, maleic acid, fumaric acid, itaconic acid, himic anhydride, glycidyl acrylate or glycidyl methacrylate.

25. A thermoplastic resin composition according to claim 14, wherein the ratio of the inorganic filler and the glass fiber (III) is 20–80% by weight of the former and 80–20% by weight of the latter.

26. A thermoplastic resin composition according to claim 14, wherein the inorganic filler (III) is talc which has an average particle size of 5.0 μ or less and shows weight loss on heating of 0.2% by weight or less when heated at 300° C. or 2 hours.

27. A thermoplastic resin composition according to claim 14, wherein the polyamide resin (I) is a polyamide having a relative viscosity of less than 2.5.

* * * * *